Patented Dec. 5, 1922.

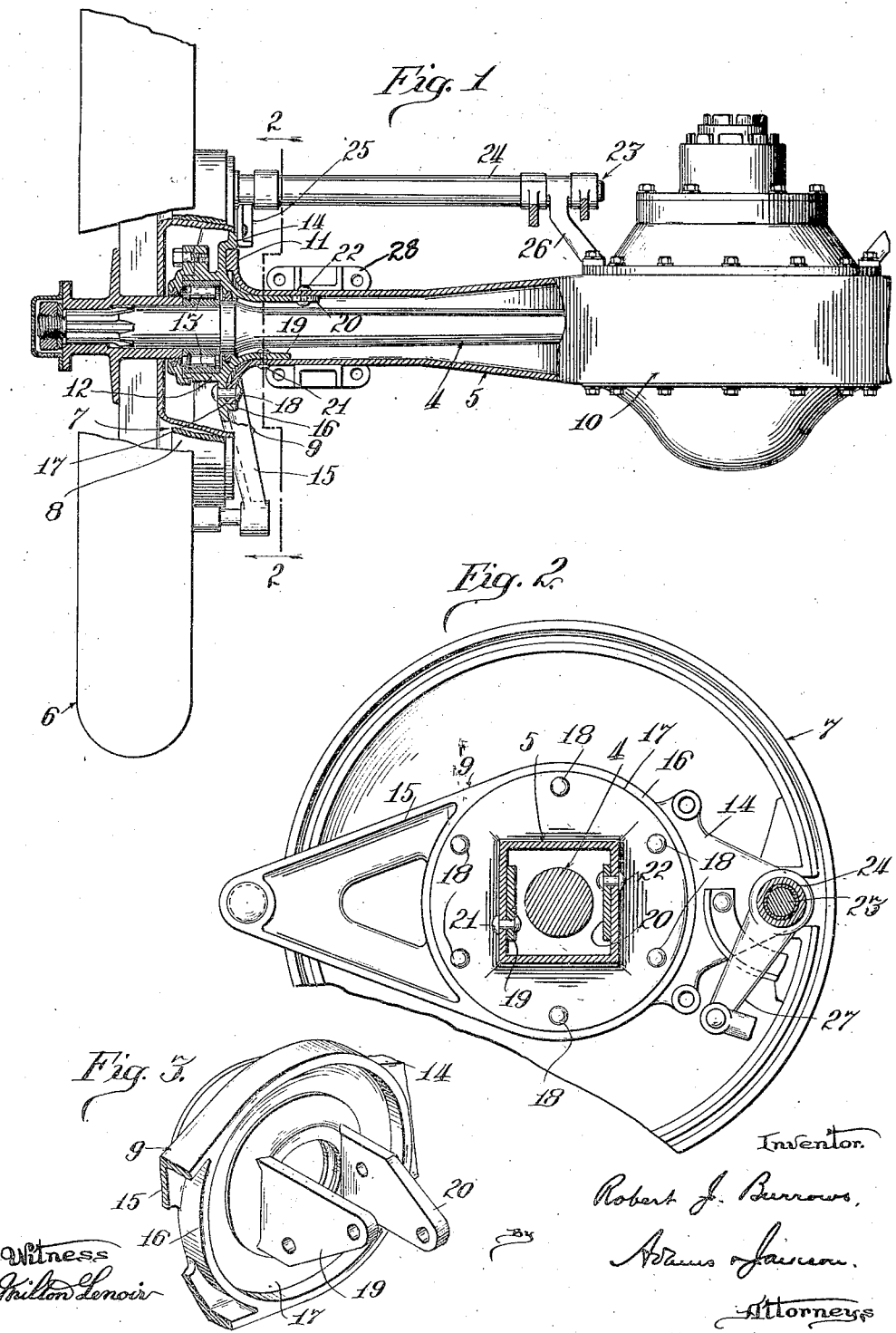

1,437,492

UNITED STATES PATENT OFFICE.

ROBERT J. BURROWS, OF BUCHANAN, MICHIGAN, ASSIGNOR TO CLARK EQUIPMENT COMPANY, OF BUCHANAN, MICHIGAN, A CORPORATION OF MICHIGAN.

AXLE FOR MOTOR VEHICLES.

Application filed March 9, 1922. Serial No. 542,320.

*To all whom it may concern:*

Be it known that I, ROBERT J. BURROWS, a citizen of the United States, and a resident of Buchanan, in the county of Berrien, in the State of Michigan, have invented certain new and useful Improvements in Axles for Motor Vehicles, of which the following is a specification, reference being had to the accompanying drawing.

My invention relates to axles for motor vehicles such as automobiles, trucks, &c., in which the rear axle is enclosed in a housing which serves also as a support for the brakes. In axles of this description the brakes are usually carried by a brake-supporting bracket connected with the rear axle housing, and it is necessary that such brackets be very firmly secured in order to withstand the severe strains to which they are subjected, particularly in the case of heavy trucks. The object of my invention is to provide an improved construction for this purpose, which object I accomplish as illustrated in the drawings and hereinafter described. What I regard as new is set forth in the claims.

In the accompanying drawings,—

Fig. 1 is a partial plan view of the rear axle of a motor vehicle and the parts associated therewith, some parts being in section;

Fig. 2 is a partial longitudinal sectional view on the line 2—2 of Fig. 1; and

Fig. 3 is a perspective view illustrating part of one of the brake-supporting brackets.

Referring to the drawings,—4 indicates the rear axle, 5 a housing therefor, 6 one of the rear wheels, 7 the usual brake drum carried thereby, 8 the usual external brake which operates on the outer peripheral portion of the brake drum, and 9 the brake-supporting bracket. As shown in Fig. 1, the housing 5 is tubular in form and connects at its inner end with the usual differential housing 10. Adjacent to the differential housing the rear axle housing 5 is tapered, as shown in Fig. 1, and as it approaches its outer end it is squared, as shown in Fig. 2. The outer end of said housing is bell-shaped and provided at its outer margin with a thickened rim or annular bead 11, as shown in Fig. 1.

The brake-supporting bracket 9 is provided with a hub portion 12 which is mounted on an antifriction bearing 13 fitted upon the axle 4, and from this hub portion radiate two oppositely-disposed arms 14, 15 by which the internal and external brakes are supported in any approved way. Adjacent to the hub portion 12 of said bracket the arms 14, 15 are provided with an annular laterally-projecting flange 16 forming a socket or recess 17 to receive the bead 11 of the housing, which fits snugly therein and is firmly secured thereto by rivets 18. The hub portion of the bracket is also provided with inwardly projecting ears 19, 20 at opposite sides of the axle, as clearly shown in the drawings, which ears fit against the inner faces of opposite sides of the housing 5 and are firmly secured thereto by rivets 21, 22. By this construction the brake-supporting bracket is firmly braced by and secured to the rear axle housing, as the flared outer end of the housing provides a broad support for said bracket and the ears 19, 20 act as additional supports and distribute both the torque and radial strains.

The part 23 is a rock-shaft by which the usual internal brakes are operated, such shaft being mounted in a sleeve 24 carried by brackets 25, 26 supported in any suitable way. 27 indicates the arm for operating the shaft 23. These parts, however, have nothing to do with my present invention. 28 indicates the lower member of the usual spring seat which is mounted on the outer portion of the rear axle housing.

What I claim as my invention and desire to secure by Letters Patent, is—

1. The combination with an axle housing, of a brake-supporting bracket disposed co-axially therewith and bearing against the outer end thereof, said bracket having laterally-projecting members in overlapping relation to the outer end portion of said housing and fixedly secured thereto.

2. The combination with an axle housing having an extended bearing surface at its outer end, of a brake-supporting bracket disposed co-axially therewith and bearing against the outer end thereof, said bracket having laterally-projecting members in overlapping relation to the outer end portion of said housing and fixedly secured thereto.

3. The combination with an axle housing having an extended bearing surface at its outer end, and a squared portion adjacent thereto, of a brake-supporting bracket bearing against the outer end of said housing and having laterally-projecting members extending into and bearing against the squared portion of said housing, and fixedly secured thereto.

4. The combination with an axle housing having a flared outer end forming an extended annular bearing surface, of a brake-supporting bracket having a recess to receive the flared end of the housing, and laterally-extending members adapted to overlap and be fixedly secured to said housing.

5. The combination with an axle and a housing therefor having an extended bearing surface at its outer end, of a brake-supporting bracket having a hub portion fitted on said axle and bearing against the end of said housing, and laterally-extending members arranged to overlap and be secured to the housing.

6. The combination with an axle and a housing therefor having an extended bearing surface at its outer end, of a brake-supporting bracket having a hub portion fitted on said axle and bearing against the end of said housing, and laterally-extending ears fitting into and bearing against opposite sides of said housing.

ROBERT J. BURROWS.